United States Patent
Yang et al.

(10) Patent No.: US 12,504,957 B2
(45) Date of Patent: Dec. 23, 2025

(54) MODEL SPECIALIZATION FOR MACHINE LEARNING BASED COMPILER OPTIMIZATION

(71) Applicant: MEDIATEK INC., Hsin-Chu (TW)

(72) Inventors: Chih-Kai Yang, Hsinchu (TW);
Wen-Han Ku, Hsinchu (TW);
Chi-Bang Kuan, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 429 days.

(21) Appl. No.: 18/074,508

(22) Filed: Dec. 4, 2022

(65) Prior Publication Data

US 2024/0184551 A1   Jun. 6, 2024

(51) Int. Cl.
*G06F 8/41*   (2018.01)
*G06N 20/00*   (2019.01)

(52) U.S. Cl.
CPC .............. *G06F 8/443* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,268,537 B1* | 2/2016 | Zhang | G06F 8/35 |
| 2021/0081725 A1* | 3/2021 | Qian | G06F 18/214 |
| 2022/0121430 A1* | 4/2022 | Venkat | G06F 8/443 |
| 2024/0177048 A1* | 5/2024 | Zeng | G06F 8/4441 |

FOREIGN PATENT DOCUMENTS

| | | |
|---|---|---|
| CN | 110688450 A | 1/2020 |
| CN | 112329348 A | 2/2021 |
| CN | 112990387 B | 7/2021 |

OTHER PUBLICATIONS

Trofin et al., "MLGO: a Machine Learning Guided Compiler Optimizations Framework," Jan. 13, 2021, arXiv:2101.04808v1 [cs.PL], last retrieved from https://arxiv.org/abs/2101.04808v1 on Aug. 23, 2025. (Year: 2021).*

* cited by examiner

Primary Examiner — Andrew M. Lyons
(74) Attorney, Agent, or Firm — Winston Hsu (57) ABSTRACT

A model specialization method for machine learning (ML) based compiler optimization includes: compiling a program by a compiler, wherein the compiler is executed by a processor; generating a specialized model according to an original model derived from a developer side and one of reinforcement learning (RL) based compiler optimization and supervised learning based compiler optimization; and utilizing the specialized model for compilation, and returning executables.

20 Claims, 7 Drawing Sheets

MODEL SPECIALIZATION FOR MACHINE LEARNING BASED COMPILER OPTIMIZATION

BACKGROUND

For conventional learning (ML) based compiler optimization, an original model is obtained by training tons of data at a developer side of the compiler, and the original model is directly sent to a user side of the compiler for inference. If a user requires better performance for a specific application, retraining the original model at the user side may be a solution. Some problems may occur, however. The compilation results may not be reproduced (i.e. may not be generalizable), and the compiler may have dramatic performance variation. In addition, due to lack of original training data and training facilities (e.g. Tensorflow), it is hard to achieve better performance by retraining the original model at the user side. As a result, a novel method for ML based compiler optimization to achieve better performance and reproducible results of the compiler is urgently needed.

SUMMARY

It is therefore one of the objectives of the present invention to provide a model specialization method for machine learning (ML) based compiler optimization and a non-transitory machine-readable medium for storing a program code that provides ML based compiler optimization when executed, to address the above-mentioned issues.

According to at least one embodiment of the present invention, a model specialization method for ML based compiler optimization is provided. The method may include: compiling a program by a compiler, wherein the compiler is executed by a processor; generating a specialized model according to an original model derived from a developer side and one of reinforcement learning (RL) based compiler optimization and supervised learning based compiler optimization; and utilizing the specialized model for compilation, and returning executables.

According to at least one embodiment of the present invention, a non-transitory machine-readable medium for storing a program code is provided. When loaded and executed by a processor, the program code instructs the processor to execute: a compiler, arranged to: compile a program; generate a specialized model according to an original model derived from a developer side and one of reinforcement learning (RL) based compiler optimization and supervised learning based compiler optimization; and utilize the specialized model for compilation, and return executables.

One of the benefits of the present invention is that, compared with the conventional ML based compiler optimization, the ML based compiler optimization with model specialization proposed by the present invention can achieve better performance in terms of speedup or code size reduction, depending upon user's design considerations or preference. In addition, compilation results (e.g. executables) generated according to the specialized model can be reproducible. As a result, the compiler can have stable performance.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
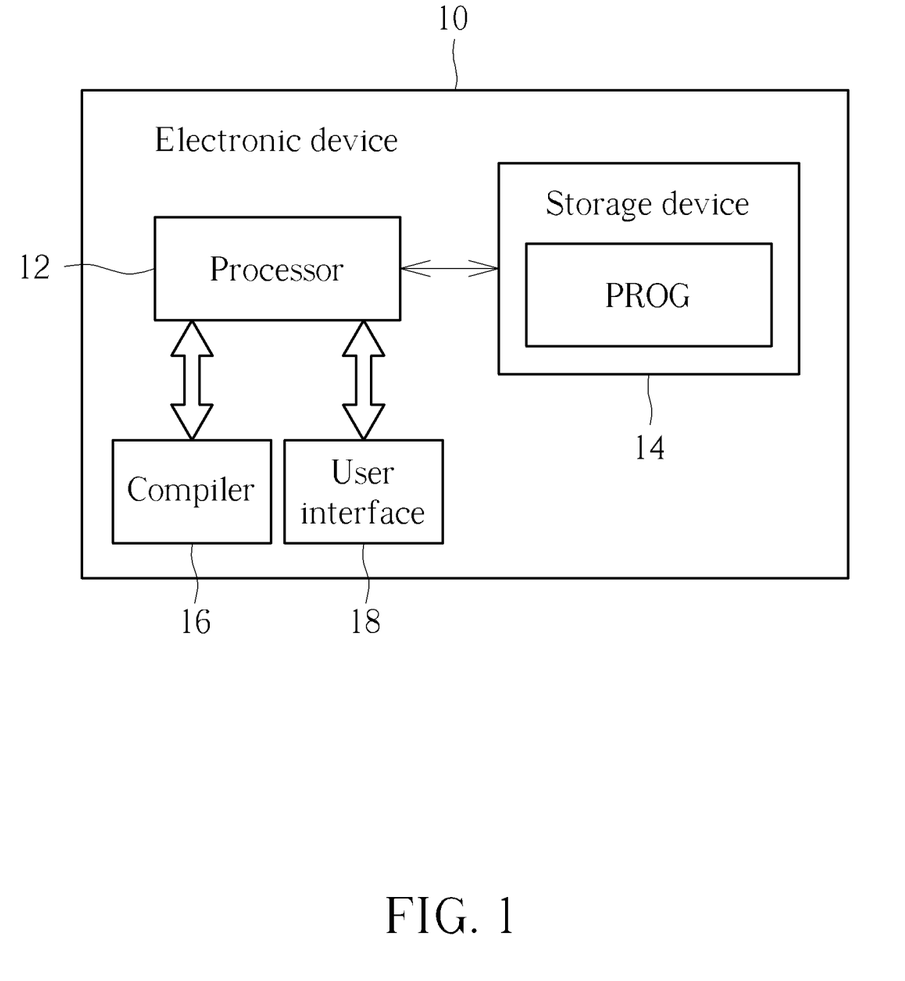
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12 and a storage device 14. The processor 12 may be a single-core processor or a multi-core processor. The storage device 14 is a non-transitory machine-readable medium, and is arranged to store computer program code PROG. The processor 12 is equipped with software execution capability. The computer program code PROG may include a plurality of software modules. For example, the software modules may include a compiler 16 and a user interface (UI) 18. As a result, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. Regarding machine learning (ML) based compiler optimization with model specialization as proposed by the present invention, it may be embodied on the electronic device 10. For example, the ML based compiler optimization with the model specialization may include software-based functions implemented by the computer program code PROG running on the processor 12.

Figure 2:
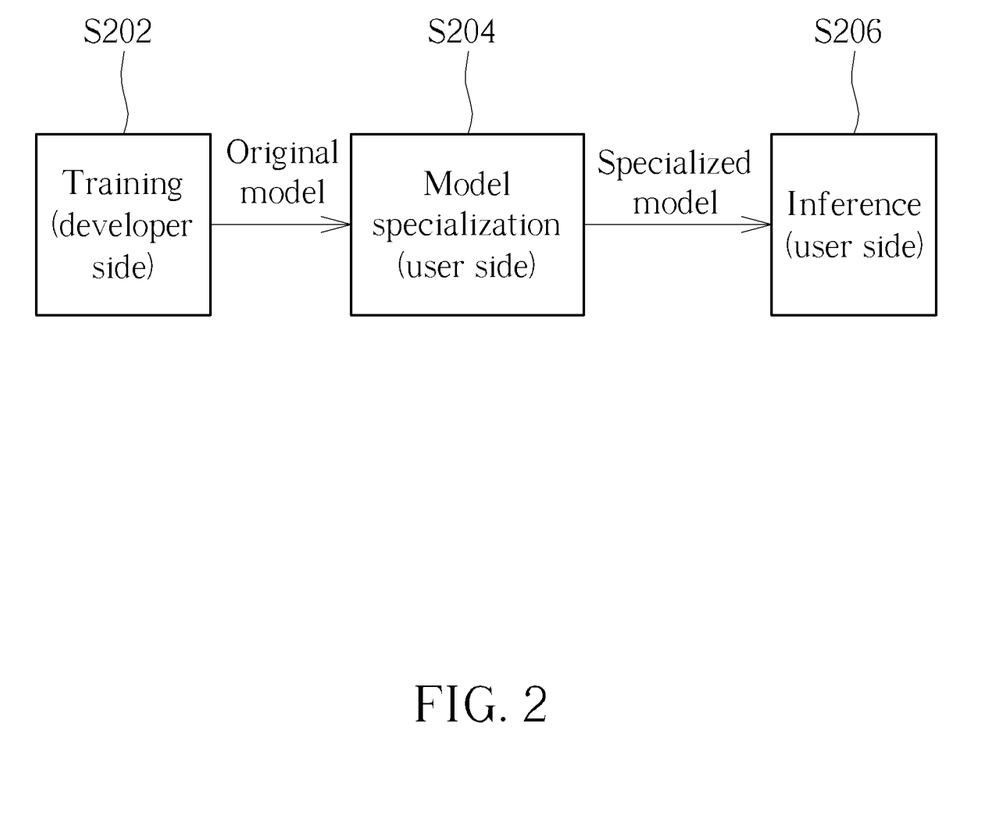
FIG. 2 is a diagram illustrating machine learning (ML) based compiler optimization with model specialization according to an embodiment of the present invention.

FIG. 2 is a diagram illustrating ML based compiler optimization with model specialization according to an embodiment of the present invention. The ML based compiler optimization with the model specialization shown in FIG. 2 may be implemented by the compiler 16 shown in FIG. 1. It is assumed that a program is compiled by the compiler 16. At a developer side of the compiler 16, an original model may be derived by training with tons of data (Step S202). At a user side of the compiler 16, the model specialization may be employed to generate a specialized model according to the original model (Step S204). Afterwards, the specialized model may be inferred for sequent operations (Step S206).

For the ML based compiler optimization, reinforcement learning (RL) based compiler optimization (e.g. function inlining or register allocation) and supervised learning based compiler optimization (e.g. unrolling factors or vectorization factors) are two major types. As a result, the model specialization flow of the present invention may be illustrated with the RL based compiler optimization and the supervised learning based compiler optimization, respectively, and the specialized model may be generated according to the original model and one of the RL based compiler optimization and the supervised learning based compiler optimization. The compiler 16 may be arranged to determine whether the ML based compiler optimization belongs to the RL based compiler optimization or the supervised learning based compiler optimization. In response to the ML based compiler optimization belonging to the RL based compiler optimization, the specialized model is generated according to the original model and the RL based compiler optimization. In response to the ML based compiler optimization belonging to the supervised learning based compiler optimization, the specialized model is generated according to the original model and the supervised learning based compiler optimization.

In addition, the UI 18 shown in FIG. 1 may be arranged to control whether to enable model specialization, wherein in response to the model specialization being enabled, the specialized model may be generated, and in response to the model specialization being not enabled, the original model may be utilized for compilation. In order to determine whether the performance is better or not, a user may define scores in terms of speedup or code size reduction through the UI 18, depending upon user's design considerations or preference. For example, scores may be defined as an old program execution time divided by a new program execution time. For another example, scores may be defined as an old code size divided by a new code size. For the above two examples, the higher the scores are, the better the performance is.

Figure 3:
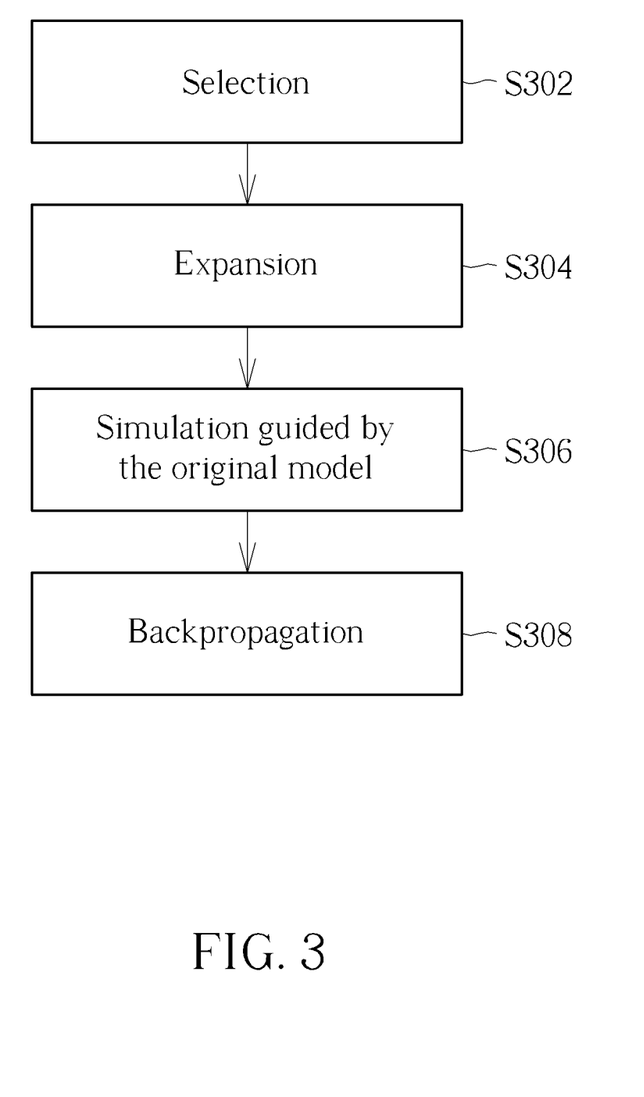
FIG. 3 is a flow chart of a modified monte carlo tree search according to an embodiment of the present invention.

For the RL based compiler optimization with the model specialization, both of the original model and the specialized model are RL models, and a modified monte carlo tree search (MCTS) is employed to find better solutions. In addition, at least one sequence of decisions may be made (e.g. at least one state-action sequence may be obtained) to generate the specialized model. FIG. 3 is a flow chart of a modified MCTS according to an embodiment of the present invention. As shown in FIG. 3, the modified MCTS may include 4 steps: selection S302, expansion S304, simulation S306, and backpropagation S308. Compared with an original MCTS which adopts random search for the simulation step, the simulation step S306 of the modified MCTS is guided by the original model obtained from the developer side of the compiler 16 (i.e. the at least one state-action sequence is decided by the original model). That is, the original MCTS decides the at least one state-action sequence randomly, and the modified MCTS utilizes the original RL model to decide the at least one state-action sequence. As a result, the modified MCTS can improve the sampling efficiency. Since operations of the original MCTS are well known to those skilled in the art, the details of similar operations included in the modified MCTS will not be described in the specification of the present invention.

In addition, the compiler 16 may be arranged to compile the program once to obtain an original score, and utilize the modified MCTS to obtain the at least one state-action sequence with at least one new score. The user may provide a time budget to the compiler 16 through the UI 18, wherein the time budget may be checked by the compiler 16 to determine whether to obtain additional state-action sequence (s) with additional new score (s). For example, under the situation that the modified MCTS has already been utilized to obtain one state-action sequence with one new score and the time budget is not exceeded, the modified MCTS may be utilized to obtain another state-action sequence (s) with another new score (s), wherein the at least one new score may include said one new score and the another new score (s). The compiler 16 may be further arranged to determine which of the original score and the at least one new score is better, and save a state-action sequence corresponding to a better score, wherein in this embodiment, the better score can be the best score among the original score and the at least one new score. For example, each score is defined as an old program execution time divided by a new program execution time, and the highest score is the best score. Afterwards, the specialized model may be generated by building a decision tree according to the state-action sequence corresponding to the best score, and the specialized model may be utilized to make a sequence of decisions for sequent operations.

Figure 4:
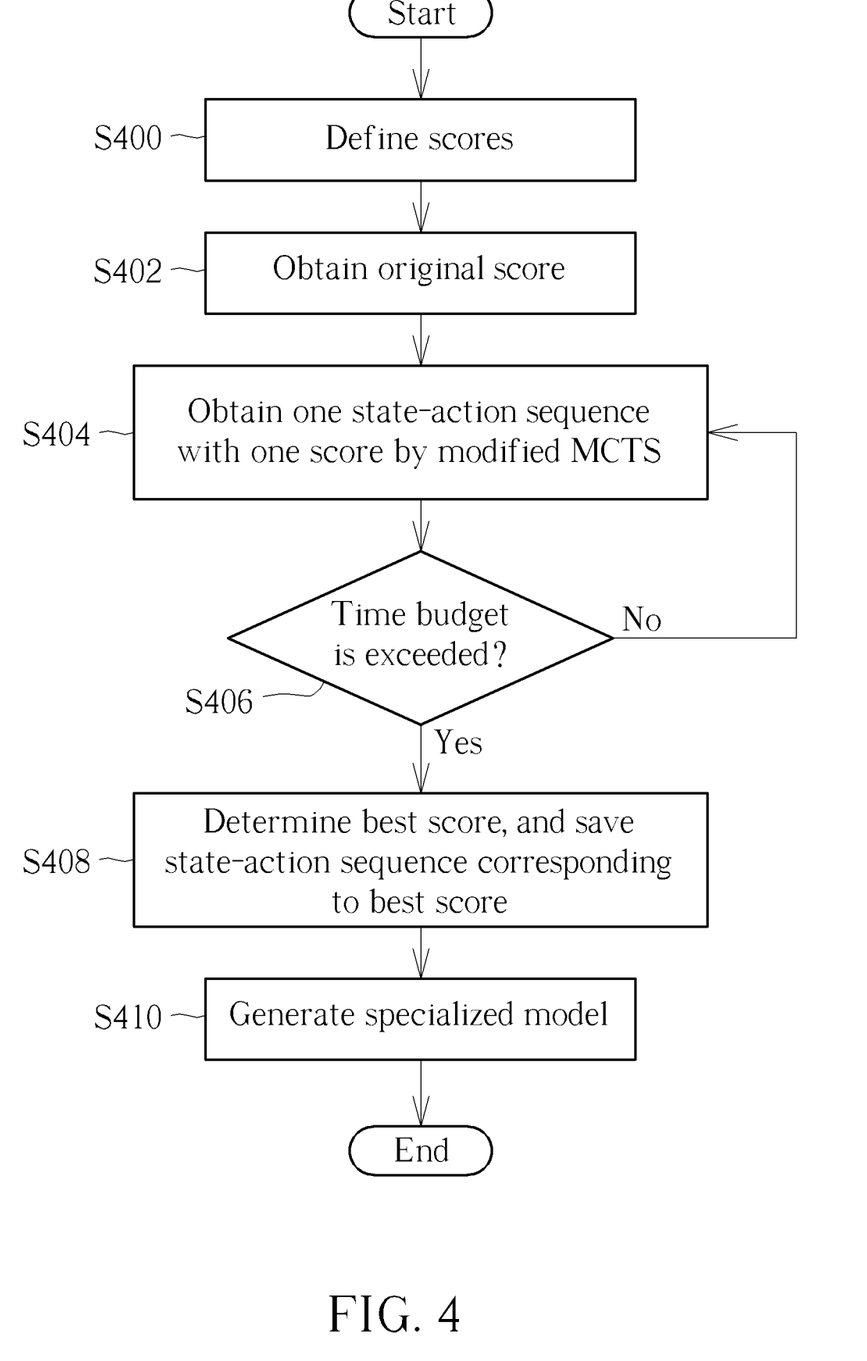
FIG. 4 is a flow chart of model specialization for reinforcement learning (RL) based compiler optimization according to an embodiment of the present invention.

FIG. 4 is a flow chart of model specialization for RL based compiler optimization according to an embodiment of the present invention. Provided that the result is substantially the same, the steps are not required to be executed in the exact order shown in FIG. 4. For example, the model specialization for the RL based compiler optimization may be performed by the compiler 16 and the UI 18 shown in FIG. 1.

In Step S400, scores may be defined by the user through the UI 18 in terms of speedup or code size reduction, depending on user's design requirement or preference.

In Step S402, a program may be compiled once by the compiler 16, to obtain the original score.

In Step S404, the modified MCTS may be utilized to obtain one state-action sequence with one new score.

In Step S406, it is determined whether the time budget is exceeded, wherein the time budget can be provided to the compiler 16 by the user through the UI 18. If Yes, Step S408 is entered; if No, Step S404 is returned, and the modified MCTS may be utilized to obtain another state-action sequence (s) with another new score (s).

In Step S408, it is determined which of the original score and the at least one new score is a best score, and a state-action sequence corresponding to the best score is saved.

In Step S410, the specialized model is generated by building a decision tree according to the state-action sequence corresponding to the best score.

Since a person skilled in the pertinent art can readily understand details of the steps after reading above paragraphs, further description is omitted here for brevity.

Figure 5:
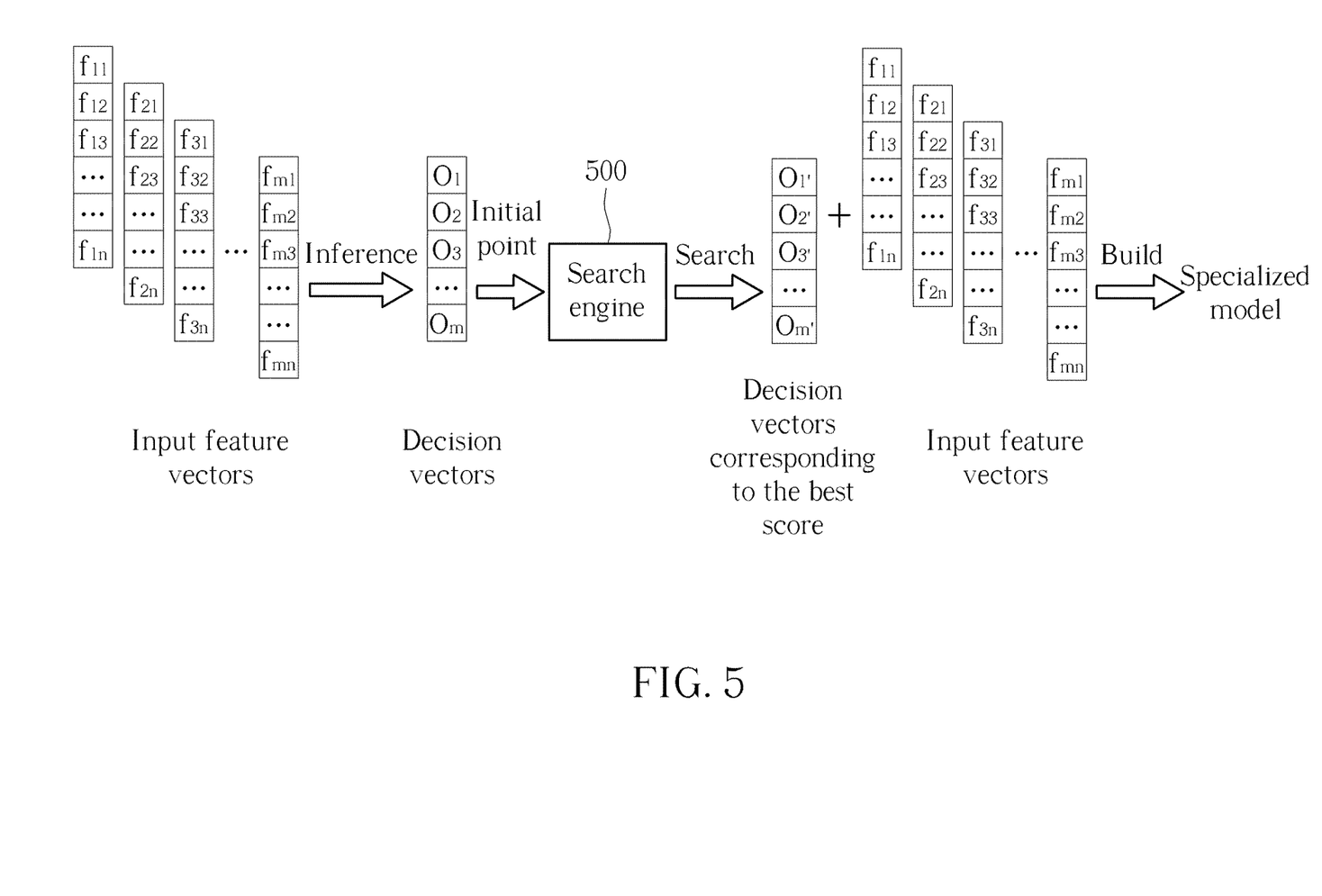
FIG. 5 is a diagram illustrating some implementation details of model specialization for supervised learning based compiler optimization according to an embodiment of the present invention.

For the supervised learning based compiler optimization with the model specialization, a plurality of sets of input feature vectors may be collected from the program, and a set of decision vectors may be obtained by inferring the original model according to the collected input feature vectors. FIG. 5 is a diagram illustrating some implementation details of model specialization for supervised learning based compiler optimization according to an embodiment of the present invention. As shown in FIG. 5, it is assumed that m sets of input feature vectors (i.e. $f_{11}$-$f_{1n}$, $f_{21}$-$f_{2n}$, $f_{31}$-$f_{3n}$, ..., $f_{m1}$-$f_{mn}$) may be collected from the program, and a set of decision vectors $o_1$-$o_m$ may be obtained by inferring the original model m times, wherein each of the decision vectors $o_1$-$o_m$ corresponds to m sets of input feature vectors, respectively. For example, the decision vector $o_1$ corresponds to the set of input feature vectors $f_{11}$-$f_{1n}$; the decision vector $o_2$ corresponds to the set of input feature vectors $f_{21}$-$f_{2n}$; and the decision vector $o_m$ corresponds to the set of input feature vectors $f_{m1}$-$f_{mn}$.

After the decision vectors $o_1$-$o_m$ are obtained, a search engine 500 with the decision vectors $o_1$-$o_m$ as an initial point may be utilized to search one set of decision vectors with one new score, wherein the search engine 500 is a software module executed by the processor 12 shown in FIG. 1. The compiler 16 may be arranged to determine whether the time budget provided by the user through the UI 18 is exceeded, wherein under the situation that the time budget is not exceeded, the search engine 500 with said one set of decision vectors as the initial point may be utilized to search another set of decision vectors with another new score (s). Afterwards, the compiler 16 may be further arranged to determine which of the original score and the at least one new score (which includes said one new score and the another new score (s)) is better, and save a set of decision vectors corresponding to a better score (labeled as "$o_1$-$o_m$" in FIG. 5), wherein in this embodiment, the better score can be the best score among the original score and the at least one new score. The specialized model may be generated by building a decision tree according to the collected input feature vectors (i.e. $f_{11}$-$f_{1n}$, $f_{21}$-$f_{2n}$, $f_{31}$-$f_{3n}$, ..., $f_{m1}$-$f_{mn}$) and the set of decision vectors corresponding to the best score (i.e. $o_1$-$o_m$), and the specialized model may be utilized to make decisions for subsequent operations.

Figure 6:
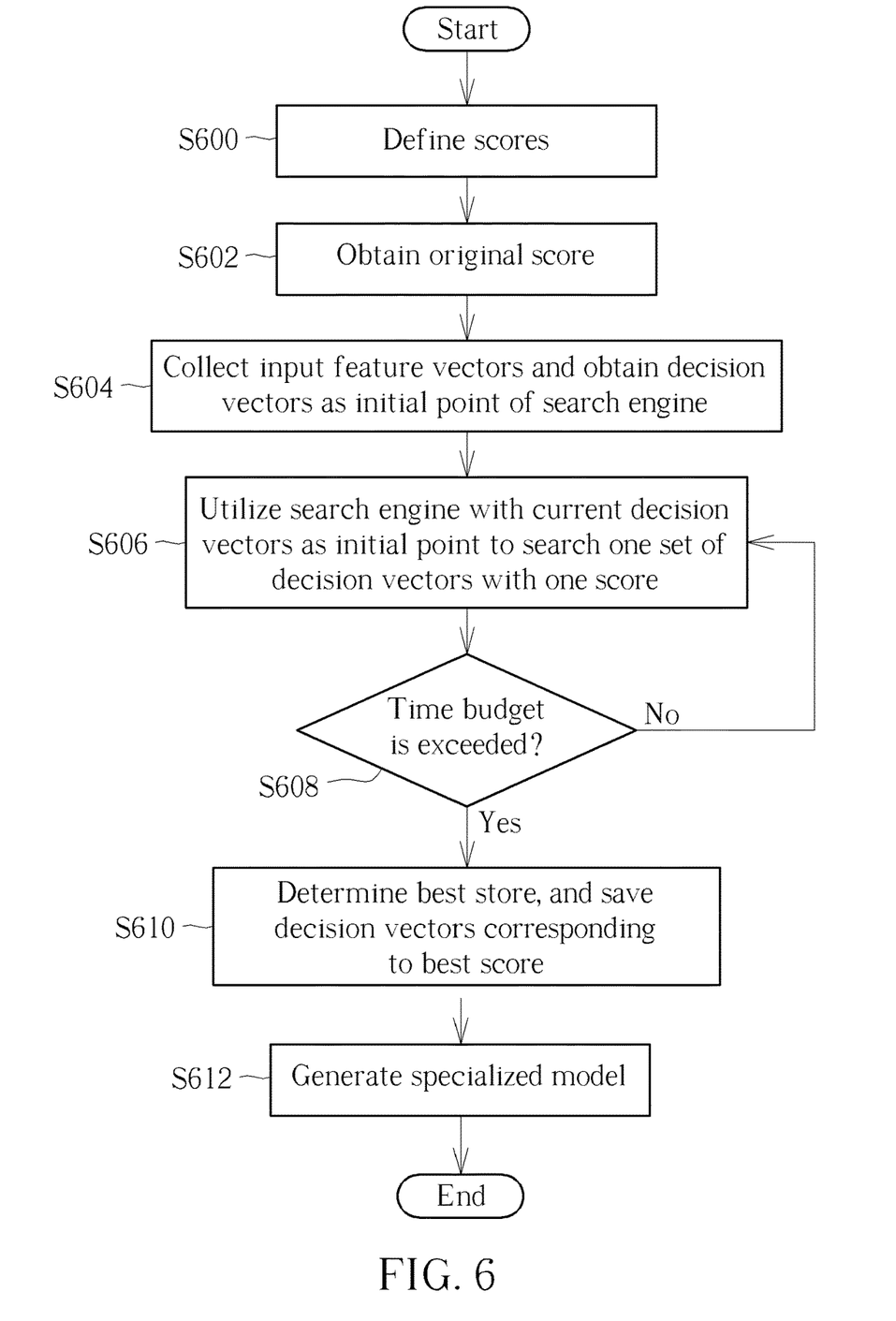
FIG. 6 is a flow chart of model specialization for supervised learning based compiler optimization according to an embodiment of the present invention.

FIG. 6 is a flow chart of model specialization for supervised learning based compiler optimization according to an embodiment of the present invention. Provided that the result is substantially the same, the steps are not required to be executed in the exact order shown in FIG. 6. For example, the model specialization for the supervised learning based compiler optimization may be performed by the compiler 16 and the UI 18 shown in FIG. 1.

In Step S600, scores may be defined in terms of speedup or code size reduction by the user through the UI 18.

In Step S602, a program may be compiled once by the compiler 16, to obtain the original score.

In Step S604, the input feature vectors may be collected, and the original model may be inferred according to the collected input feature vectors, to obtain a set of decision vectors as an initial point of the search engine.

In Step S606, the search engine with current decision vectors (e.g. the set of decision vectors obtained in Step S604) as the initial point may be utilized to search one set of decision vectors with one new score.

In Step S608, it is determined whether the time budget is exceeded, wherein the time budget can be provided to the compiler 16 by the user through the UI 18. If Yes, Step S610 is entered; if No, Step S606 is returned, and the search engine with said one set of decision vectors as the initial point may be utilized to search another set of decision vectors with another new score (s).

In Step S610, it is determined which of the original score and the at least one score is a best score, and a set of decision vectors corresponding to the best score is saved.

In Step S612, the specialized model is generated by building a decision tree according to the collected input feature vectors and the set of decision vectors corresponding to the best score.

Since a person skilled in the pertinent art can readily understand details of the steps after reading above paragraphs, further description is omitted here for brevity.

Figure 7:
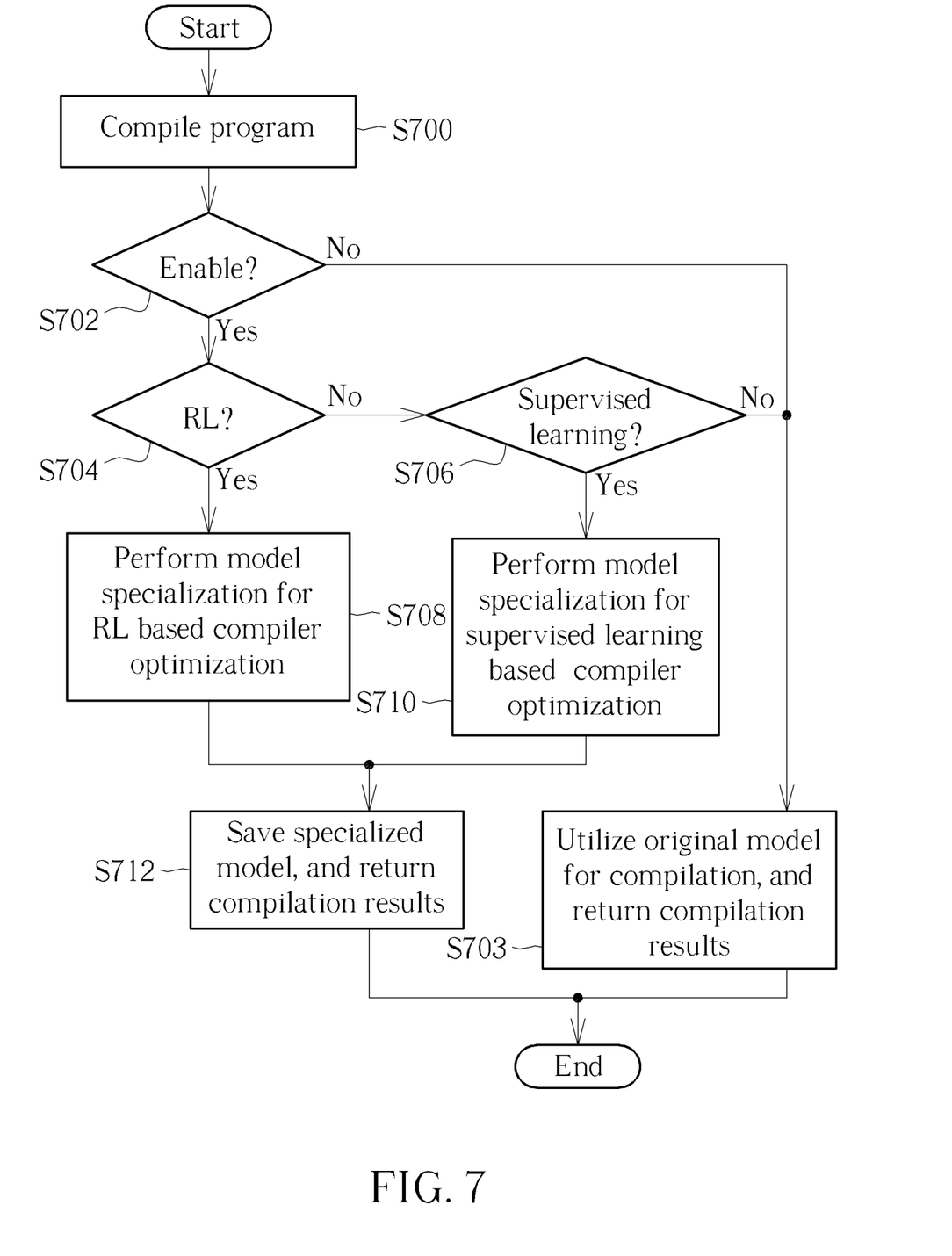
FIG. 7 is a flow chart of a model specialization method for ML based compiler optimization according to an embodiment of the present invention.

FIG. 7 is a flow chart of a model specialization method for ML based compiler optimization according to an embodiment of the present invention. Provided that the result is substantially the same, the steps are not required to be executed in the exact order shown in FIG. 7. For example, the model specialization for the ML based compiler optimization may be performed by the compiler 16 and the UI 18 shown in FIG. 1.

In Step S700, a program is compiled by the compiler 16.

In Step S702, it is determined whether to enable model specialization. If yes, Step S704 is entered; if no, Step S703 is entered. For example, the user may enable the model specialization through the UI 18 and Step S702 would determine to enter Step S704.

In Step S703, the original model is utilized for compilation, and compilation results (e.g. executables) are returned.

In Step S704, it is determined that whether the ML based compiler optimization belongs to the RL based compiler optimization. If yes, Step S708 is entered; if no, Step S706 is entered.

In Step S706, it is determined that whether the ML based compiler optimization belongs to the supervised learning based compiler optimization. If yes, Step S710 is entered; if no, Step S703 is entered.

In Step S708, the process of the model specialization for the RL based compiler optimization such as the model specialization flow shown in FIG. 4 is performed.

In Step S710, the process of the model specialization for the supervised learning based compiler optimization such as the model specialization flow shown in FIG. 6 is performed.

In Step S712, the specialized model is saved, and the compilation results (e.g. the executables) are returned.

Since a person skilled in the pertinent art can readily understand details of the steps after reading above paragraphs, further description is omitted here for brevity.

Compared with the conventional ML based compiler optimization, the ML based compiler optimization with model specialization proposed by the present invention may achieve better performance in terms of speedup or code size reduction, depending upon user's design considerations or preference. In addition, compilation results (e.g. executables) generated according to the specialized model may be reproducible. As a result, the compiler may have stable performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A model specialization method for machine learning (ML) based compiler optimization, wherein the ML based compiler optimization is implemented by a processor executing a program code, and the model specialization method comprises:

compiling a program by a compiler, wherein the compiler is executed by a processor;

determining whether the ML based compiler optimization belongs to a reinforcement learning (RL) based compiler optimization or a supervised learning based compiler optimization;

in response to the ML based compiler optimization belonging to the RL based compiler optimization, generating the specialized model according to an original model and the RL based compiler optimization, wherein the original model is derived from a developer side, a modified monte carlo tree search (MCTS) is employed in the RL based compiler optimization, and a simulation step of the modified MCTS is guided by the original model, in order to improve a sampling efficiency of the processor;

in response to the ML based compiler optimization belonging to the supervised learning based compiler optimization, generating the specialized model according to the original model and the supervised learning based compiler optimization; and generating multiple reproducible compilation results according to the specialized model.

2. The model specialization method of claim 1, further comprising:

controlling whether to enable model specialization by a user interface (UI);

wherein in response to the model specialization being enabled, the specialized model is generated.

3. The model specialization method of claim 1, wherein generating the specialized model according to the original model and the RL based compiler optimization comprises:

compiling the program, by the compiler, to obtain an original score;

utilizing the modified MCTS to obtain at least one state-action sequence with at least one new score;

determining which of the original score and the at least one new score is better, and saving a state-action sequence corresponding to a better score; and generating the specialized model by building a decision tree according to the state-action sequence corresponding to the better score.

4. The model specialization method of claim 3, wherein the original score and the at least one new score are defined in terms of speedup or code size reduction through a user interface (UI).

5. The model specialization method of claim 3, wherein utilizing the modified MCTS to obtain the at least one state-action sequence with the at least one score comprises:

utilizing the modified MCTS to obtain one state-action sequence with one new score;

determining whether a time budget is exceeded; and in response to the time budget being not exceeded, utilizing the modified MCTS to obtain another state-action sequence with another new score.

6. The model specialization method of claim 5, wherein the time budget is defined through a user interface (UI).

7. The model specialization method of claim 1, wherein generating the specialized model according to the original model and the supervised learning based compiler optimization comprises:

compiling the program by the compiler to obtain an original score;

collecting a plurality of sets of input feature vectors and inferring the original model to obtain a first set of decision vectors;

utilizing a search engine with the first set of decision vectors as an initial point to search at least one set of decision vectors with at least one new score;

determining which of the original score and the at least one new score is better, and saving a set of decision vectors corresponding to a better score; and generating the specialized model by building a decision tree according to the plurality of sets of input feature vectors and the set of decision vectors corresponding to the better score.

8. The model specialization method of claim 7, wherein the original score and the at least one new score are defined in terms of speedup or code size reduction through a user interface (UI).

9. The model specialization method of claim 7, wherein utilizing the search engine with the first set of decision vectors as the initial point to search the at least one set of decision vectors with the at least one score comprises:

utilizing the search engine with the first set of decision vectors as the initial point to search one set of decision vectors with one new score;

determining whether a time budget is exceeded; and in response to the time budget being not exceeded, utilizing the search engine with said one set of decision vectors as the initial point to search another set of decision vectors with another new score.

10. The model specialization method of claim 9, wherein the time budget is defined through a user interface (UI).

11. A non-transitory machine-readable medium for storing a program code, wherein when loaded and executed by a processor, the program code instructs the processor to execute:

a compiler, arranged to:

compile a program;

determine whether the ML based compiler optimization belongs to a reinforcement learning (RL) based compiler optimization or a supervised learning based compiler optimization;

in response to the ML based compiler optimization belonging to the RL based compiler optimization, generate the specialized model according to an original model and the RL based compiler optimization, wherein the original model is derived from a developer side, a modified monte carlo tree search (MCTS) is employed in the RL based compiler optimization, and a simulation step of the modified MCTS is guided by the original model, in order to improve a sampling efficiency of the processor;

in response to the ML based compiler optimization belonging to the supervised learning based compiler optimization, generate the specialized model according to the original model and the supervised learning based compiler optimization; and generate multiple reproducible compilation results according to the specialized model.

12. The non-transitory machine-readable medium of claim 11, wherein the program code further instructs the processor to execute:

a user interface (UI), arranged to control whether to enable model specialization;

wherein in response to the model specialization being enabled, the specialized model is generated.

13. The non-transitory machine-readable medium of claim 11, wherein in response to the ML based compiler optimization belonging to the RL based compiler optimization, the compiler is further arranged to:

compile the program to obtain an original score;
utilize the modified MCTS to obtain at least one state-action sequence with at least one new score;
determine which of the original score and the at least one new score is better, and save a state-action sequence corresponding to a better score; and
generate the specialized model by building a decision tree according to the state-action sequence corresponding to the better score.

14. The non-transitory machine-readable medium of claim 13,
wherein the program code further instructs the processor to execute:
a user interface (UI), wherein the original score and the at least one new score are defined in terms of speedup or code size reduction through the UI.

15. The non-transitory machine-readable medium of claim 13,
wherein the compiler is further arranged to:
utilize the modified MCTS to obtain one state-action sequence with one new score;
determine whether a time budget is exceeded; and
in response to the time budget being not exceeded, utilize the modified MCTS to obtain another state-action sequence with another new score.

16. The non-transitory machine-readable medium of claim 15,
wherein the program code further instructs the processor to execute:
a user interface (UI), wherein the time budget is defined through the UI.

17. The non-transitory machine-readable medium of claim 11, wherein in response to the ML based compiler optimization belonging to the supervised learning based compiler optimization, the compiler is further arranged to:
compile the program to obtain an original score;
collect a plurality of sets of input feature vectors and infer the original model to obtain a first set of decision vectors;
utilize a search engine with the first set of decision vectors as an initial point to search at least one set of decision vectors with at least one new score;
determine which of the original score and the at least one new score is better, and save a set of decision vectors corresponding to a better score; and
generate the specialized model by building a decision tree according to the plurality of sets of input feature vectors and the set of decision vectors corresponding to the better score.

18. The non-transitory machine-readable medium of claim 17,
wherein the program code further instructs the processor to execute:
a user interface (UI), wherein the original score and the at least one new score are defined in terms of speedup or code size reduction through the UI.

19. The non-transitory machine-readable medium of claim 17,
wherein the compiler is further arranged to:
utilize the search engine with the first set of decision vectors as the initial point to search one set of decision vectors with one new score;
determine whether a time budget is exceeded; and
in response to the time budget being not exceeded, utilize the search engine with said one set of decision vectors as the initial point to search another set of decision vectors with another new score.

20. The non-transitory machine-readable medium of claim 19,
wherein the program code further instructs the processor to execute:
a user interface (UI), wherein the time budget is defined through the UI.

* * * * *